(12) United States Patent
Kadota et al.

(10) Patent No.: US 6,597,425 B2
(45) Date of Patent: Jul. 22, 2003

(54) LIQUID CRYSTAL DISPLAY DEVICE

(75) Inventors: Hisashi Kadota, Kanagawa (JP);
Hirohide Fukumoto, Kagoshima (JP);
Hiromi Fukumori, Miyazaki (JP)

(73) Assignee: Sony Corporation (JP)

( * ) Notice: Subject to any disclaimer, the term of this patent is extended or adjusted under 35 U.S.C. 154(b) by 8 days.

(21) Appl. No.: 09/847,330

(22) Filed: May 3, 2001

(65) Prior Publication Data

US 2002/0003599 A1 Jan. 10, 2002

(30) Foreign Application Priority Data

May 12, 2000 (JP) .................................. P2000-140078

(51) Int. Cl.[7] .......................................... G02F 1/1339
(52) U.S. Cl. ...................................................... 349/156
(58) Field of Search ................................. 349/156, 187

(56) References Cited

U.S. PATENT DOCUMENTS

| | | | |
|---|---|---|---|
| 5,499,128 A | 3/1996 | Hasegawa | 349/155 |
| 5,978,061 A | 11/1999 | Miyazaki | 349/155 |
| 5,978,063 A | 11/1999 | Crawford | 349/155 |
| 6,067,144 A | * 5/2000 | Murouchi | 349/154 |
| 6,299,949 B1 | * 10/2001 | Shioda et al. | 252/299.5 |

FOREIGN PATENT DOCUMENTS

EP   1 048 972   11/2000

* cited by examiner

*Primary Examiner*—Toan Ton
(74) *Attorney, Agent, or Firm*—Rader, Fishma & Grauer PLLC; Ronald P. Kananen

(57) ABSTRACT

There is provided a liquid crystal display device in which film thickness irregularities and rubbing irregularities of orientation films are minimized in which superior image quality is provided even when columnar spacers are disposed therein. The liquid crystal display device has a structure in which a liquid crystal substance is sandwiched between a pair of substrates facing each other with the space therebetween controlled to a specific value by a plurality of the columnar spacers independent from each other, wherein the placement density of the columnar spacers is 100 to 2000/mm$^2$, and the sectional area of the columnar spacers is 1 to 100 $\mu$m$^2$.

7 Claims, 3 Drawing Sheets

LIQUID CRYSTAL DISPLAY DEVICE

BACKGROUND OF THE INVENTION

1. Field of the Invention

The present invention relates to a liquid crystal display device in which film thickness irregularities and rubbing irregularities of orientation films are minimized in which superior image quality is provided even when columnar spacers are disposed therein.

2. Description of the Related Art

A liquid crystal display device generally has a structure in which a liquid crystal substance is sandwiched between a pair of substrates facing each other. Image display by the liquid crystal display device is achieved by applying a voltage between the pair of substrates, and by controlling the light transmissivity based on the double refraction phenomenon displayed by liquid crystal substances. Thus, if the space between the substrates facing each other is not uniform in a screen, the intensity of the electric field applied between electrodes facing each other becomes different in the screen, and deterioration of the image quality occurs. Thus, in conventional practice, the space between a pair of substrates is controlled by scattering a given amount of small glass beads on one substrate as space keeping members, and as a result, due to the dispersion of the glass beads in the liquid crystal substance, the spacing of the pair of substrates is controlled.

It is however very difficult to uniformly scatter glass beads on the substrate, and sometimes, the glass beads are unevenly distributed (localized) on the screen, resulting in degradation of the image quality.

In recent years, instead of scattering glass beads on the substrates, space keeping members, an insulating resin such as a photosensitive resin or an insulator such as an oxide film consisting of $SiO_2$ or the like formed in islands (i.e., columnar spacers independent from each other), is provided on one of a pair of substrates facing each other using photo-lithographic technology and etching technology to achieve superior positional accuracy, dimensional accuracy and shape accuracy.

However, an orientation film consisting of polyimide (PI) or the like is formed and rubbed after columnar spacers are formed, and if the columnar spacers are formed unevenly, noticeable film thickness irregularities or rubbing irregularities attributable to the unevenness of the columnar spacers themselves can be generated when forming the orientation film, and thus, the liquid crystal orientation becomes abnormal, resulting in a degradation of the image quality of the liquid crystal display device.

SUMMARY OF THE INVENTION

Accordingly, it is an object of the present invention to solve problems in the conventional technology, and in particular, to provide a liquid crystal display device in which film thickness irregularities and rubbing irregularities of an orientation film are minimized and in which superior image quality is provided even when columnar spacers are disposed therein.

The inventors of the present invention have found that the above-described problem can be solved or mitigated by limiting the placement density, the array, the size, etc. of columnar spacers in a given range, and have thus realized the present invention.

There is provided a liquid crystal display device having a structure in which a liquid crystal substance is sandwiched between a pair of substrates facing each other with the space therebetween controlled to a specific value by a plurality of columnar spacers independent from each other, wherein the placement density of the columnar spacers is 100 to 2000/$mm^2$.

There is provided a manufacturing method of the liquid crystal display device having a structure in which a liquid crystal substance is sandwiched between a pair of substrates facing each other including a step in which columnar spacers are disposed on one of a pair of the substrates disposed at a placement density of 100 to 2000/$mm^2$.

DESCRIPTION OF THE PREFERRED EMBODIMENTS

A liquid crystal display device in accordance with the present invention has a structure in which a liquid crystal substance is sandwiched between a pair of substrates facing each other with the space controlled to a specific value by a plurality of columnar spacers independent from each other.

The findings of the inventors of the present invention indicate that, if the placement density of columnar spacers is too high, the orientation of the liquid crystal substance is impeded, and orientation disturbance, referred to as disclination, easily occurs, and the orientation film applied on the columnar spacers accumulates around the columnar spacers, and the orientation irregularities in film thickness are easily generated. On the other hand, it has also been found that, if the placement density of columnar spacers is too low, film thickness irregularities become noticeable and the image quality is degraded.

Figure 1:
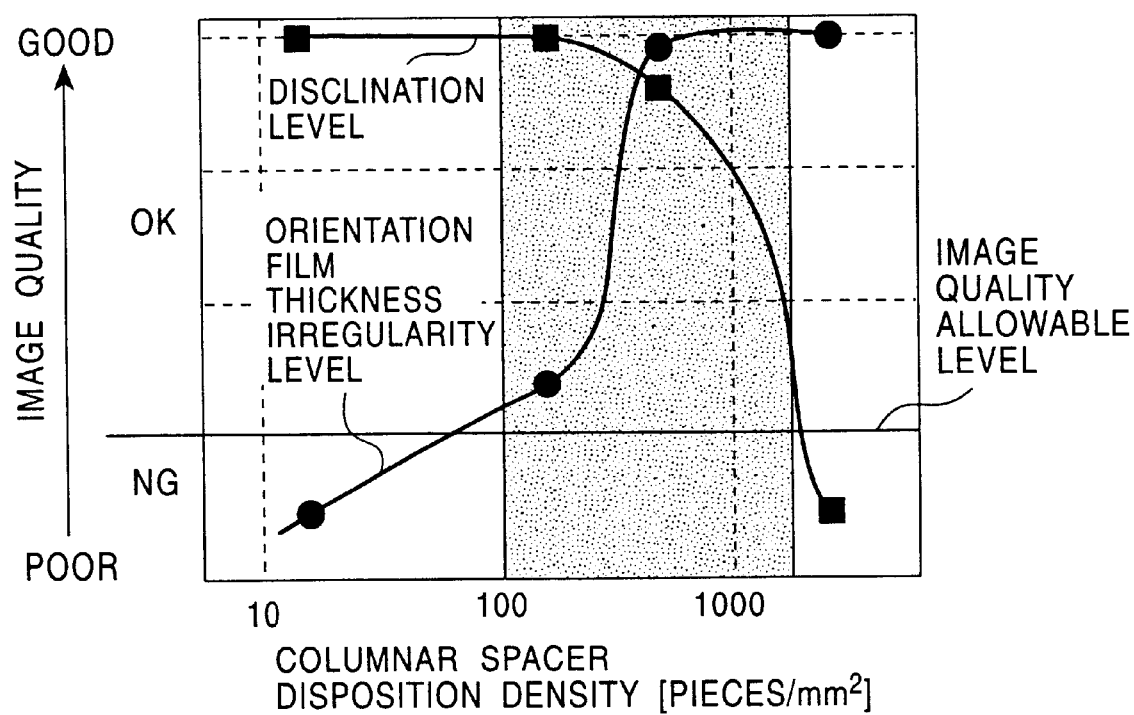
FIG. 1 shows the relationship between the placement density of columnar spacers and the image quality.

Thus, the relationship between the placement density of columnar spacers and the image quality was examined by manufacturing a liquid crystal device as shown in a below-described embodiment to find the relationship shown in FIG. 1. FIG. 1 shows that the preferable placement density of columnar spacers is 100 to 2000/$mm^2$, and the optimum placement density is 200 to 400/$mm^2$. This means that, if the placement density of columnar spacers is less than 100/$mm^2$, the columnar spacers are too far from each other, and film thickness irregularities of the orientation film become noticeable, and the minimum allowable level of the image quality is not achieved. On the other hand, it has also been found that, if the placement density of columnar spacers exceeds 2000/$mm^2$, the columnar spacers are brought close to each other, peripheral portions of film thickness irregularities of the orientation film overlap, film thickness irregularities are less noticeable as a result, disclination is easily generated, and the minimum allowable level of the image quality is not achieved.

The orientation of the liquid crystal is less easily impeded when columnar spacers are as small as possible, and their sectional area is preferably 1 to 100 $\mu m^2$, and more preferably, 5 to 25 $\mu m^2$.

Figure 2A:
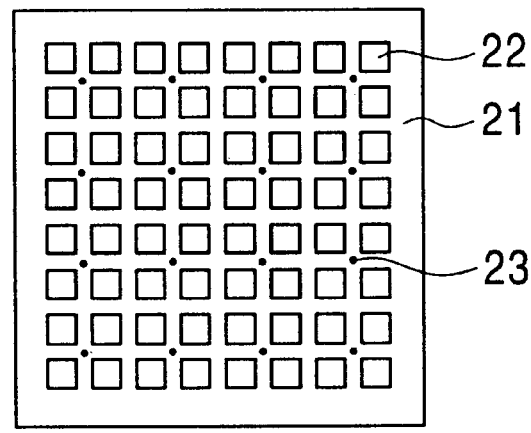
FIG. 2 is a schematic representation of the disposition pattern of columnar spacers in accordance with the present invention.

In the liquid crystal display device in accordance with the present invention, columnar spacers 23 are preferably disposed equally at each pixel electrode 22 when a plurality of the pixel electrodes 22 are formed in a matrix form on one substrate 21 of a pair of substrates as shown in FIG. 2A. The space between the substrates in a screen can thus be kept more constant. In addition, the film thickness irregularities of the orientation films can also be made uniform.

Figure 2B:
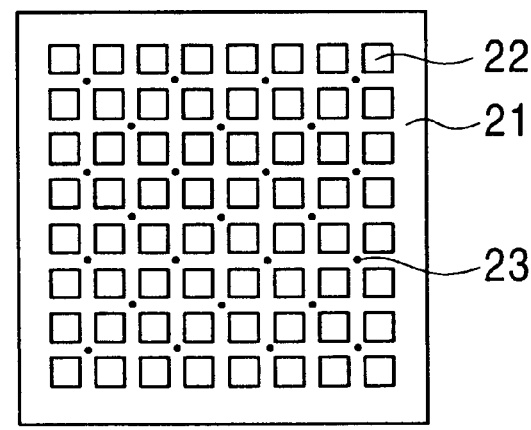
Figure 2C:
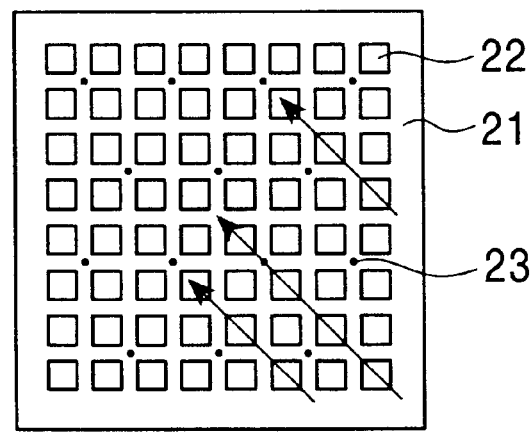

For other examples of the equivalent array of the columnar spacers 23 to each pixel electrode 22, the columnar spacers are preferably disposed in a checkered manner as shown in FIG. 2B or in an array as shown in FIG. 2C (in which the distance between an arbitrary columnar spacer and a plurality of columnar spacers adjacent thereto is substantially constant). In particular, in the case in FIG. 2C, the columnar spacers overlap less during a rubbing treatment in which rubbing is in the direction of arrows compared to the cases in FIGS. 2A and 2B, film thickness irregularities and rubbing irregularities of the orientation films can be made uniform, and disclination is less easily generated.

As described above, the liquid crystal display device in accordance with the present invention is characterized by the placement density, and the array or the sectional area of columnar spacers. However, other components; a pair of substrates, the liquid crystal substance, electrodes or the like may be of a configuration similar to that of publicly known liquid crystal display devices.

The liquid crystal display device in accordance with the present invention, that is, the liquid crystal display device having the structure in which the liquid crystal substance is sandwiched between a pair of substrates facing each other, can be manufactured according to the publicly known manufacturing method with the exception that columnar spacers are disposed with the placement density of 100 to 2000/mm$^2$. For instance, a photosensitive resin may be applied on one of a pair of the substrates and dried to form a photosensitive resin layer, and the photosensitive resin layer can be machined by the photo-lithographic method into columnar spacers formed with the placement density of 100 to 2000/mm$^2$.

Embodiment

Figure 3:
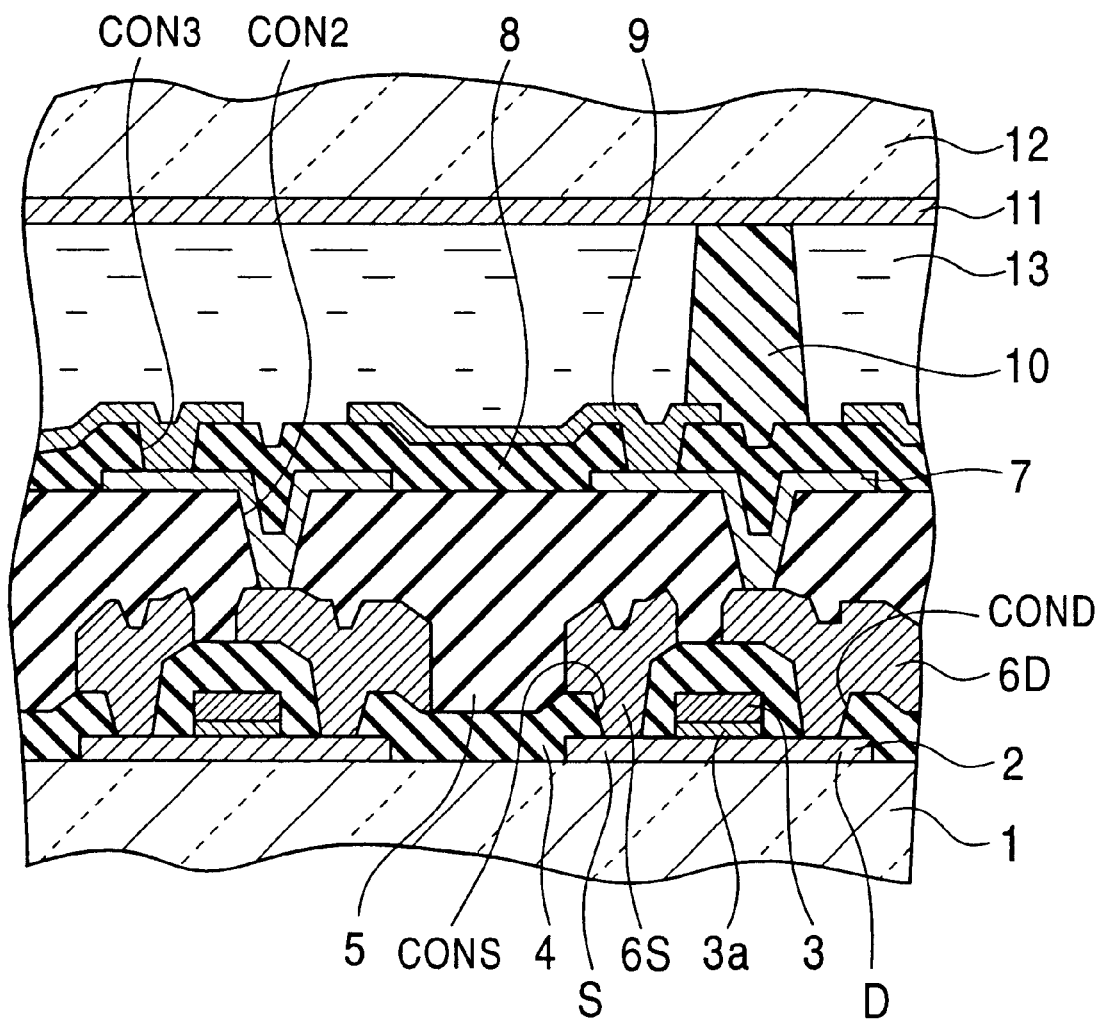
FIG. 3 is a schematic sectional view of the liquid crystal display device in accordance with the present invention.

FIG. 3 shows an example of the manufacture of the liquid crystal display device in accordance with the present invention (active matrix liquid crystal display device).

A semi conductor thin film 2 (for example, consisting of polycrystalline silicon) forming a TFT with a thickness of 50 to 150 nm is formed on a driving substrate 1 consisting of glass or the like. If necessary, Si$^+$ ions are implanted in the non-crystalline thin film, and then, the thin film is heated to around 600° C. or annealed with an excimer laser beam in order to achieve larger grain sizes.

This semi conductor thin film 2 is patterned into a predetermined shape to form a gate insulating film 3a of 10 to 100 nm in thickness using a means of the thermal oxidation method, the LPCVD method, etc.

Next, a metal layer as a gate electrode 3 consisting of polycrystalline silicon or MoSi, WSi, Al, Ta, Mo/Ta, Mo, W, Ti, Cr, etc. is formed and patterned. When the gate electrode 3 is formed of polycrystalline silicon, P$^+$ ions, etc. may be thermally diffused to reduce the resistance.

Thereafter, the ions of the impurities are implanted by the ion-implanting method or the ion-doping method with the gate electrode 3 as a mask to form a source area S and a drain area D.

Successively, a film with a thickness of 400 to 800 nm, consisting of PSG, NSG, etc., is deposited by the atmospheric pressure CVD method to form a first interlayer insulating film 4. Contact holes CONS and COND communicated with the source area S and the drain area D are opened therein.

A conductive thin film consisting of Al, etc. of 300 to 700 nm in thickness is formed by the sputtering. The film is patterned into a predetermined shape and machined on a source electrode 6S and a drain electrode 6D. A film of 300 to 2000 nm in thickness consisting of PSG, etc., is deposited by the atmospheric pressure CVD method to form a second interlayer insulating film 5. The surface of the second interlayer insulating film 5 may be flattened as necessary by the CMP method, etc.

A contact hole CON2 is opened in the second interlayer insulating film 5 in order to electrically connect the drain electrode 6D to a metal film which is also used for a light-shielding film 7. A metal thin film forming the light-shielding film 7 which is also used for a black mask, consisting of, for example, Ti, Al, Mo, Cr, W, TiNx or the silicide of these metals, is deposited to a thickness of 5 to 500 nm by the sputtering method or the like, and patterned to a predetermined shape.

A film consisting of PSG, etc. is deposited on this light-shielding film 7 to the thickness of 300 to 2000 nm by the atmospheric pressure CVD method to form a third interlayer film 8. In order to improve the orientation of the liquid crystal, the surface of the third interlayer insulating film 8 may be flattened using the CMP method, etc., as necessary. The surfaces of the second and third interlayer insulating films may be flattened using SOG or an organic film by the spin coating method.

Then, a contact hole CON3 for electrical connection to a pixel electrode 9 is opened in the third interlayer insulating film 8. A metal film or a metal oxide film forming the pixel electrode 9 (a transparent conductive film such as an ITO film in the case of a transmission type liquid crystal display device, or a light reflective conductive film consisting of Ag, Al, etc. in the case of a reflection type liquid crystal display device) is deposited at a thickness of 30 to 1000 nm by the sputtering method, etc., and patterned to a predetermined shape. This film may be annealed at about 200 to 400° C., as necessary.

A photosensitive resin coating or the like is applied thereon to the thickness of 2 to 6 $\mu$m, and patterned in islands as shown in FIG. 2C to form columnar spacers 10 with a density of 100 to 2000/mm$^2$. The columnar spacers 10 may be formed by forming an inorganic film of not only the photosensitive resin but also SiO$_2$ or the like by the CVD method, or by forming a non-photosensitive resin coating by the spin-coating method or the printing method, and then patterning the film. The sectional area of the columnar spacers 10 is set to be 1 to 100 $\mu$m$^2$.

Successively, an orientation film (not shown in the figure) consisting of PI or the like is formed on the driving substrate 1 by a regular method, rubbed to orient the liquid crystal with a buffing material such as cotton, and overlapped and fixed to a counter substrate 12 provided with a similarly processed counter electrode 11 to constitute a liquid crystal cell. Then, a liquid crystal 13 is filled in the liquid crystal cell, and heat treated as necessary to complete a liquid crystal device.

In the liquid crystal display device obtained, the distance between the driving substrate 1 and the counter substrate 12 is kept at a height in alignment with the height of the columnar spacers 10, film thickness irregularities and rubbing irregularities of the orientation film are less noticeable, and disclination is also less easily generated. High quality image can thus be obtained.

In the liquid crystal display device in accordance with the present invention, the image which is free from any disturbance of the liquid crystal orientation, less noticeable in film thickness irregularities or rubbing irregularities of the orientation film, and high in quality, can be obtained by specifying the placement density, the array and the size of the columnar spacers.

What is claimed is:

1. A liquid crystal display device comprising:
    a pair of substrates facing each other with the space therebetween;
    a liquid crystal substance sandwiched between the pair of substrates; and
    a plurality of columnar spacers independent from each other which regulate the space between the pair of substrates,
    wherein the placement density of said columnar spacers is 100 to 2000/mm$^2$.

2. A liquid crystal display device according to claim 1, wherein the cross-sectional area of the columnar spacers is 1 to 100 $\mu$m$^2$.

3. A liquid crystal display device according to one of claims 1 and 2, wherein a plurality of pixel electrodes are formed in a matrix on one of the pair of substrates, and the columnar spacers are disposed equally at each pixel electrode.

4. A liquid crystal display device according to claim 1, wherein the columnar spacers are disposed in a checkered manner.

5. A liquid crystal display device according to claim 1, wherein the distance between an arbitrary one of the columnar spacers and the plurality of columnar spacers adjacent thereto is substantially constant.

6. A manufacturing method of a liquid crystal display device having a structure in which a liquid crystal substance is sandwiched between a pair of substrates facing each other; said method comprising a step of forming columnar spacers at a placement density of 100 to 2000/mm$^2$ on one of the pair of substrates.

7. A manufacturing method according to claim 6, further comprising the steps of:
    applying a photosensitive resin on one of said pair of substrates;
    drying said photosensitive resin to form a photosensitive resin layer; and
    machining said photosensitive resin layer into columnar spacers by a photo-lithographic method.

* * * * *